(12) United States Patent
Brereton et al.

(10) Patent No.: US 10,730,569 B2
(45) Date of Patent: Aug. 4, 2020

(54) AERODYNAMIC DEVICES FOR MOVING VEHICLES

(71) Applicant: INVENTURE HOLDINGS, LLC, Wake Forest, NC (US)

(72) Inventors: Timothy J. Brereton, Rolesville, NC (US); Joseph A. Schetz, Blacksburg, VA (US)

(73) Assignee: Inventure Holdings, LLC, Wake Forest, NC (US)

( * ) Notice: Subject to any disclaimer, the term of this patent is extended or adjusted under 35 U.S.C. 154(b) by 33 days.

(21) Appl. No.: 16/123,165

(22) Filed: Sep. 6, 2018

(65) Prior Publication Data
US 2019/0002035 A1 Jan. 3, 2019

Related U.S. Application Data

(63) Continuation of application No. 15/652,086, filed on Jul. 17, 2017, now Pat. No. 10,093,363.
(Continued)

(51) Int. Cl.
*B62D 35/00* (2006.01)
*B60K 16/00* (2020.01)
(Continued)

(52) U.S. Cl.
CPC .............. *B62D 35/001* (2013.01); *B60K 1/04* (2013.01); *B60K 16/00* (2013.01); *B62D 37/02* (2013.01);
(Continued)

(58) Field of Classification Search
CPC .. B62D 35/001; B62D 35/002; B62D 35/007; B62D 37/02
(Continued)

(56) References Cited

U.S. PATENT DOCUMENTS

| 4,307,857 A | 12/1981 | Godbersen |
| 4,395,939 A | 8/1983 | Hough et al. |

(Continued)

FOREIGN PATENT DOCUMENTS

| DE | 3916692 A1 * | 11/1990 | .......... F02B 29/0431 |
| FR | 2613682 A1 * | 10/1988 | ........... B62D 35/001 |
| WO | WO 2016/151319 A1 | 9/2016 | |

OTHER PUBLICATIONS

Why Max Fans (Mixed-Flow Fans) Can Outperform Centrifugal Fans (Fifth Season Gardening Co.), Jan. 5, 2016, https://fifthseasongardening.com/why-max-fans-mixed-flow-fans-can-outperform-centrifugal-fans.
(Continued)

*Primary Examiner* — Hilary L Gutman
(74) *Attorney, Agent, or Firm* — Bookoff McAndrews, PLLC

(57) ABSTRACT

A vehicle or trailer assembly is disclosed comprising at least one fan positioned on an exterior of the vehicle or trailer, wherein the at least one fan redirects or accelerates air moving over, around, or through the exterior of the vehicle or trailer. Also disclosed is a fan assembly comprising a manifold configured to be positioned on an outside surface of a vehicle, along an axis transverse to a direction of travel of the vehicle. The fan assembly also includes a plurality of motorized fans rotatably mounted along the axis of the manifold, such that the motorized fans are configured to accelerate air passing along the outside surface or within an exterior of the vehicle, in the direction of travel of the vehicle.

20 Claims, 13 Drawing Sheets

Related U.S. Application Data

(60) Provisional application No. 62/425,671, filed on Nov. 23, 2016, provisional application No. 62/363,472, filed on Jul. 18, 2016.

(51) Int. Cl.
  *B60K 1/04* (2019.01)
  *B62D 37/02* (2006.01)
  *B62D 63/08* (2006.01)
  *F15D 1/00* (2006.01)

(52) U.S. Cl.
  CPC .............. *B62D 63/08* (2013.01); *F15D 1/008* (2013.01); *B60K 2001/0438* (2013.01); *B60K 2016/003* (2013.01); *B60Y 2200/142* (2013.01); *B60Y 2200/145* (2013.01); *B60Y 2400/216* (2013.01)

(58) Field of Classification Search
  USPC ............................................ 296/180.1–180.5
  See application file for complete search history.

(56) References Cited

U.S. PATENT DOCUMENTS

| | | |
|---|---|---|
| 4,592,436 A | 6/1986 | Tomei |
| 5,265,435 A | 11/1993 | Richardson |
| 7,185,944 B2 | 3/2007 | Shahbazi |
| 9,333,995 B1 | 5/2016 | Piotrowski |
| 9,446,670 B1 | 9/2016 | McCorkindale |
| 2006/0001292 A1 | 1/2006 | Shahbazi |
| 2006/0170247 A1 | 8/2006 | Shahbazi |
| 2007/0187990 A1 | 8/2007 | Shahbazi |
| 2008/0150321 A1* | 6/2008 | Neale .................... B62D 35/00 296/180.1 |
| 2011/0011072 A1 | 1/2011 | Watts |
| 2012/0276832 A1 | 11/2012 | Quaak et al. |
| 2013/0106135 A1 | 5/2013 | Praskovsky et al. |
| 2013/0168999 A1* | 7/2013 | Hitchcock ............. B62D 35/00 296/180.1 |
| 2016/0121941 A1* | 5/2016 | D'Arcy ............... B62D 35/005 701/49 |
| 2016/0251041 A1 | 9/2016 | Wolf |
| 2017/0029044 A1 | 2/2017 | Senatro |
| 2017/0183043 A1 | 6/2017 | Connors |
| 2017/0240221 A1 | 8/2017 | Gaylard et al. |

OTHER PUBLICATIONS

International Search Report and Written Opinion for corresponding International Application No. PCT/US2017/042497, dated Oct. 6, 2017 (8 pages).

* cited by examiner

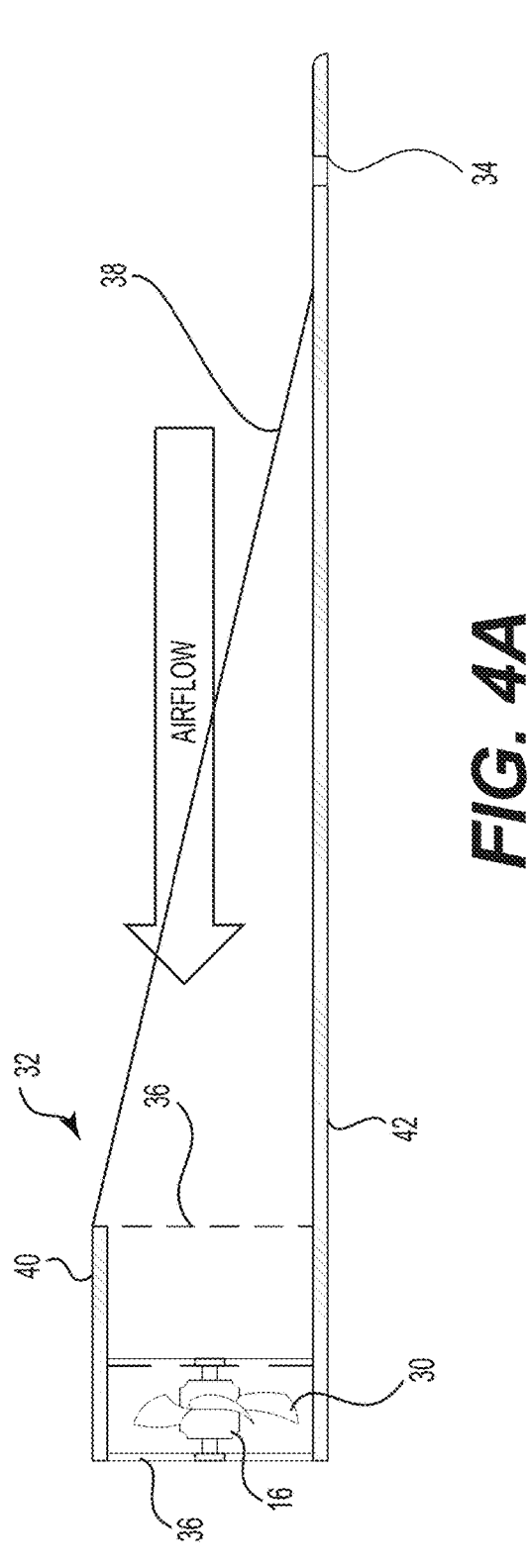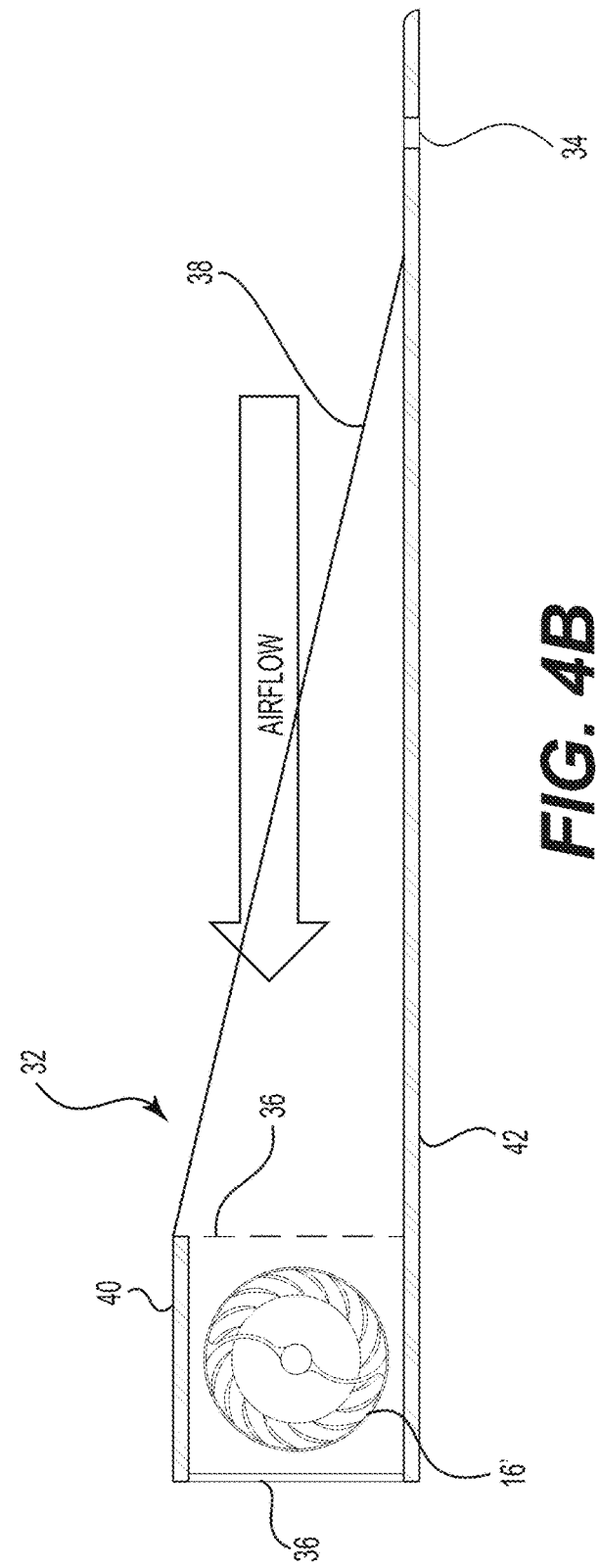

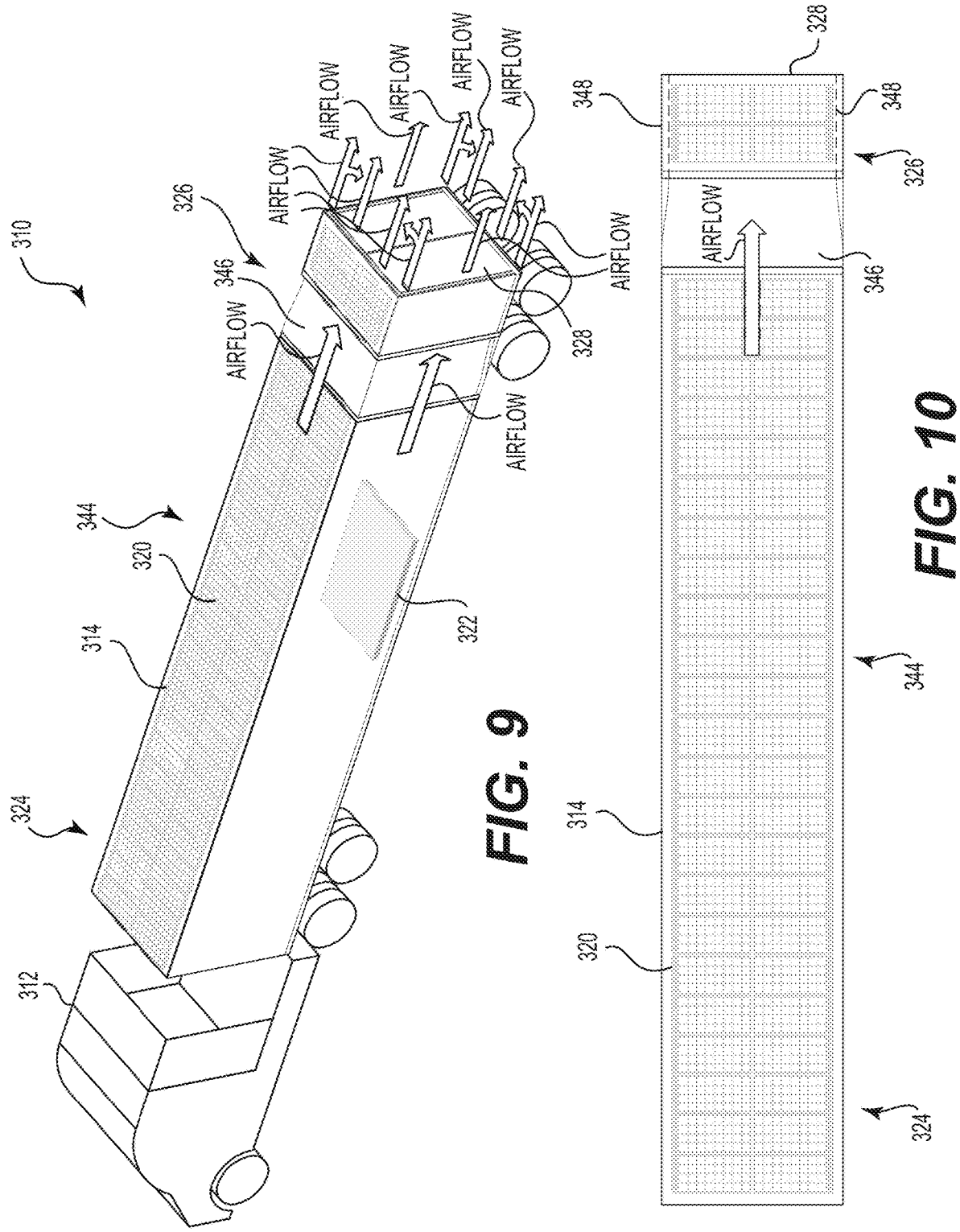

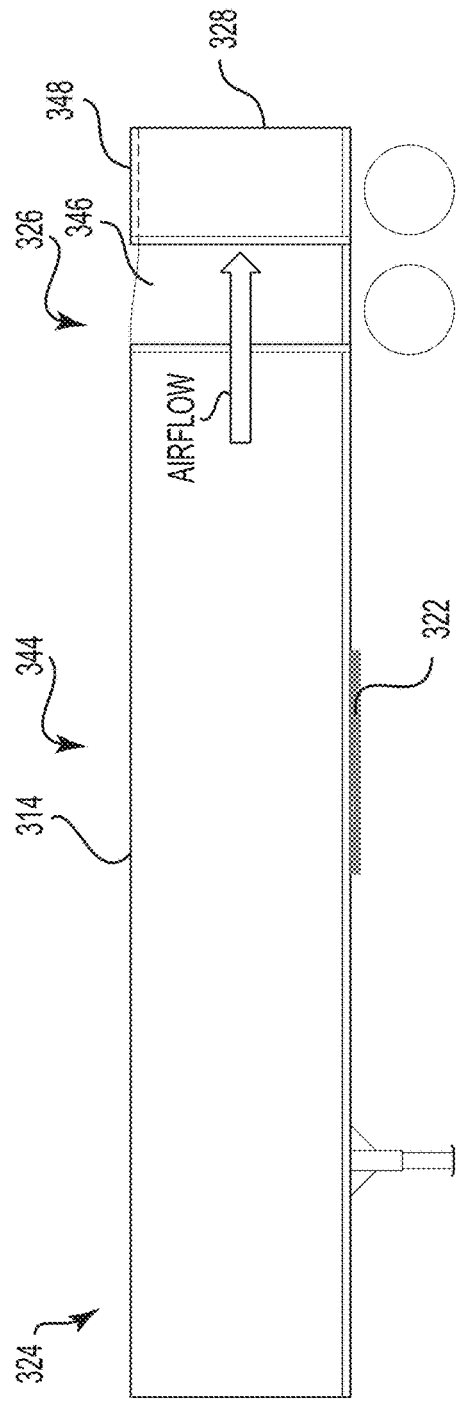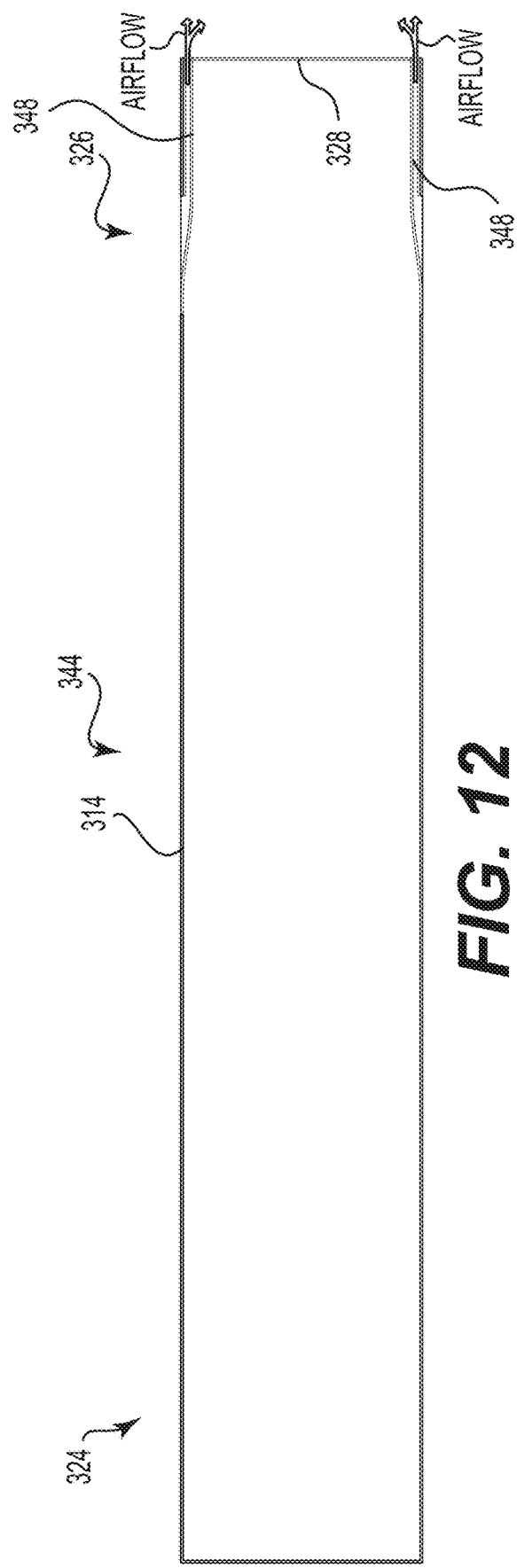

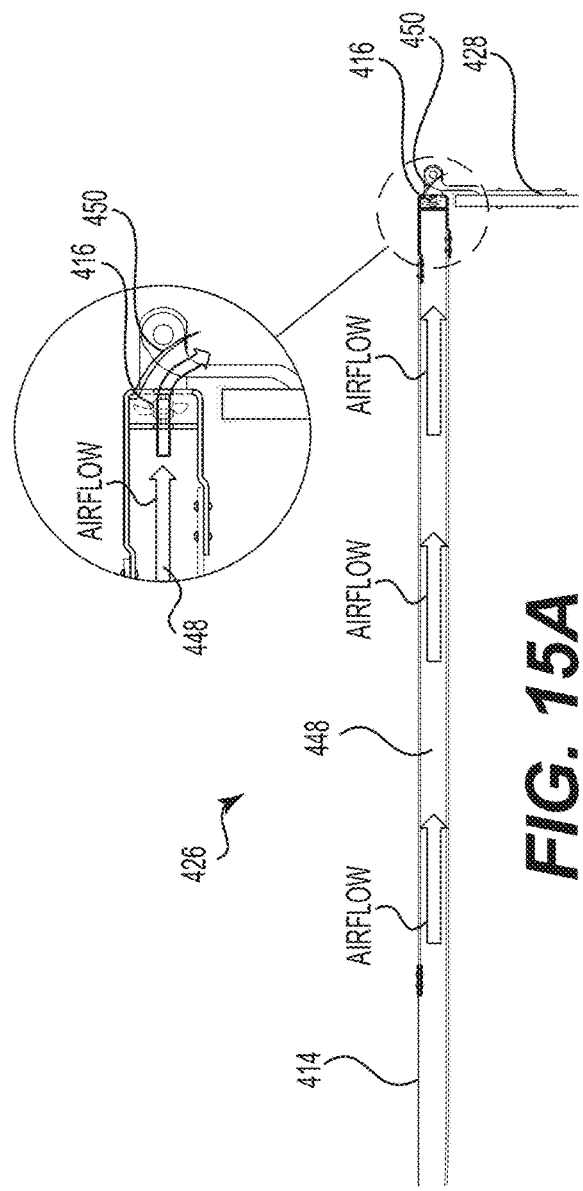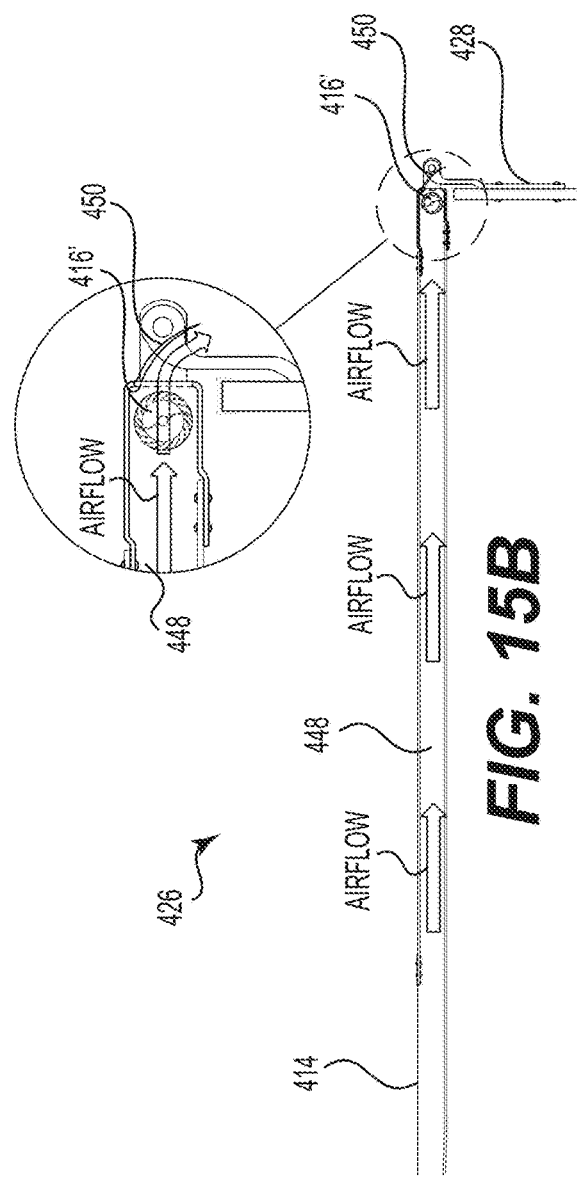

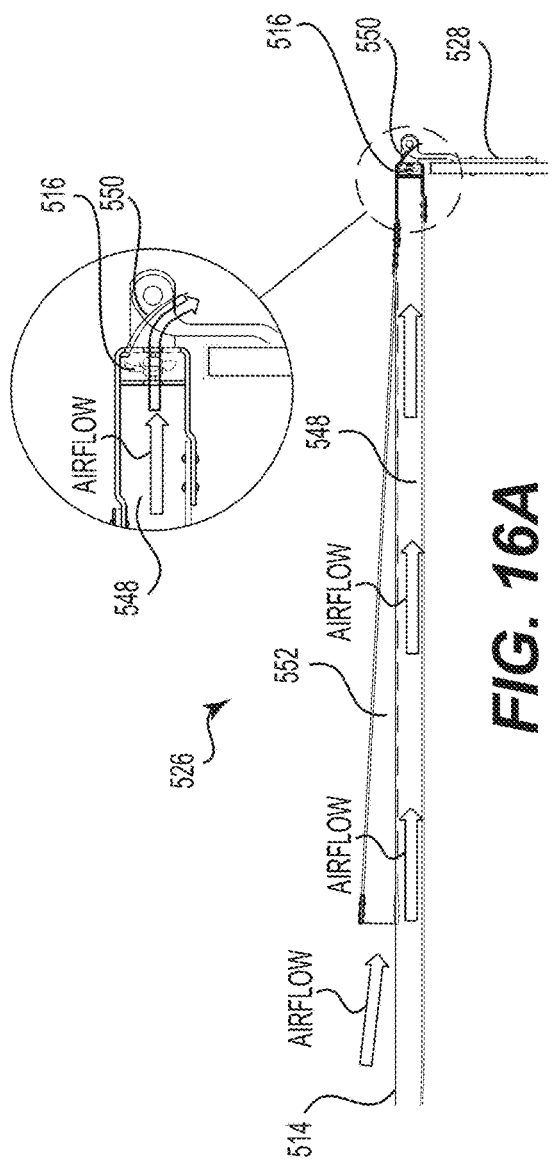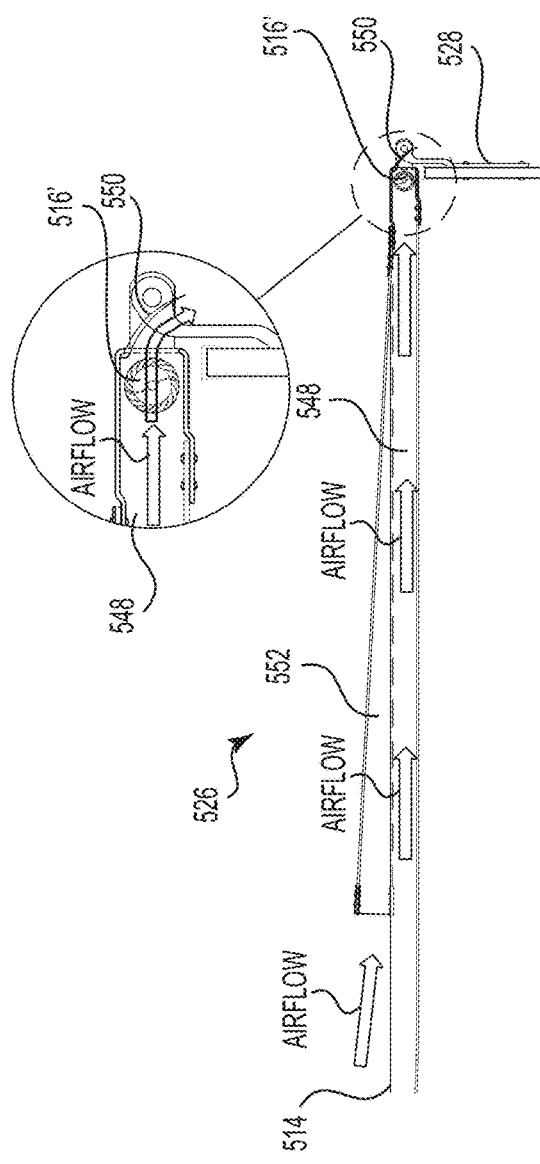

AERODYNAMIC DEVICES FOR MOVING VEHICLES

CROSS-REFERENCE TO RELATED APPLICATIONS

This patent application is a continuation application of and claims the benefit of priority to U.S. application Ser. No. 15/652,086, filed Jul. 17, 2017, which claims the benefit of priority under 35 U.S.C. § 119 to U.S. Provisional Patent Application No. 62/425,671 filed Nov. 23, 2016, and to U.S. Provisional Patent Application No. 62/363,472 filed Jul. 18, 2016, each of which are herein incorporated by reference in their entireties.

TECHNICAL FIELD

Various aspects of the present disclosure relate generally to devices, systems, and methods configured to improve fuel economy and/or aerodynamics in moving vehicles. More specifically, the present disclosure relates to aerodynamic devices, systems, and methods for improving fuel economy and/or aerodynamics in moving vehicles.

BACKGROUND

According to the American Trucking Association, trucks move more than 9.4 billion tons of freight in the U.S. every year. This represents 68.5% of all freight by tonnage and over $642 billion of revenue, or about 81% of revenue from all U.S. freight transport modes. This vital industry has grown in importance as customers now expect to receive shipped items within days or even hours, a value proposition that only the versatility and speed of trucking can match. Additionally, new end customer demands for speed mean business-to-business transactions must happen faster.

As a result of the push for faster and cheaper delivery, efficiency is at a premium. The Department of Transportation estimates that trucks on U.S. highways consume more than 43 billion gallons of fuel annually. That represents over 1,700 gallons per vehicle and just 7.3 miles per gallon. This consumption also represents a significant contribution to greenhouse gases and air pollution. While strides have been made in cleaning air output in diesel engines, fuel efficiency remains unaddressed. Improving fuel efficiency reduces total fuel usage and helps the trucking industry to be more sustainable, while also meeting the growing performance demands stemming from customer delivery preferences. An electrically powered truck consumes less fuel, but producing, transmitting, and storing of that electricity likely still requires fuel. Furthermore, an electrically powered truck does not move through the air more efficiently than a gas or diesel powered truck.

Fuel efficiency may be improved by looking beyond the powertrain. Of course, the power train and simple rolling resistance are key contributors to fuel efficiency, but as trucks reach highway speeds, resistance from air friction and pressure friction causes up to 70% of fuel burn or other energy consumption. Pressure drag represents more than 90% of total drag. While existing accessory products on the market promise to improve drag efficiency by redirecting air, most products only contribute to marginal gains and lack durability. New products able to generate increased gains at a lower cost may improve fuel burn and energy consumption efficiency. Moreover, devices, systems, or methods that improve fuel burn and energy consumption efficiency in tractors and trailers may apply to other vehicles, even though the size and shapes may differ.

The devices and methods of the current disclosure may rectify some of the deficiencies described above or address other aspects of the prior art.

SUMMARY

Examples of the present disclosure relate to, among other things, aerodynamic devices for moving vehicles. Each of the examples disclosed herein may include one or more of the features described in connection with any of the other disclosed examples.

Aspects of this disclosure may improve upon past efforts to achieve efficiency through trailer design by focusing primarily on pressure drag improvements and on air and road friction improvements. Rather than redirecting air flowing past a vehicle or trailer, aspects of the present disclosure use fans and other devices to generate air flow and/or accelerate the air passing the trailer or tractor, thus reducing speed differential and allowing the trailer or tractor to pass through air with less pressure and friction drag. These air speed-changing devices may be placed at various locations, for example, the sides, top, undercarriage, and/or aft of the vehicle or trailer. These devices may be positioned in multiple locations across the trailer and may be used in conjunction with other data sensors, such as, for example, wind speed indicators, to allow the air speed-changing devices to assist in reducing drag and instability due to cross winds and improving fuel efficiency. The air speed devices may also provide lift by thrusting downward, and such downward positioning may reduce road friction and improve fuel efficiency. Furthermore, the air speed devices may be controlled and/or programmed to correlate to the wind speed, that is, the speed at which the vehicle is moving relative to the air, rather than to the ground. For example, the data sensors may detect the wind speed, and may signal and/or control the power and/or programming of the air speed devices such that the air speed devices accelerate the air passing the trailer or tractor to match or to approximate the wind speed.

Several additional features may potentially enhance the benefits of the air speed devices. In one instance, the devices may have the ability to reverse thrust, which may allow more efficient braking, save energy, and reduce wear on the drive train (i.e., reducing the use of engine braking) and brake pads. This reverse thrust may be combined with flaps to create beneficial drag when desired.

In another instance, in some cases, an air speed device may become a parasitic load on a tractor's battery system or reduce efficiency gains through the device's additional weight. Depending on the cargo carried by the trailer and the duty cycle (e.g., extended highway time vs. short trips to relay merchandise between local warehousing), small solar panels may be added to the trailer roof to improve the efficiency of the battery system, exploiting an underutilized surface when used in combination with an auxiliary battery system. Alternatively, an air speed device may be powered by any power source, including a combustion engine, such as, for example, the engine of the tractor, an electric engine, a hybrid engine, or any other power source. The air speed devices may also have a weight such that their net benefit remains positive. As such, the air speed device may be constructed of various light, yet strong, materials.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges means the value, limit, and/or range+/−10%.

BRIEF DESCRIPTION OF THE DRAWINGS

The accompanying drawings, which are incorporated in and constitute a part of this specification, illustrate exemplary features of the present disclosure and together with the description, serve to explain the principles of the disclosure. There are many aspects and embodiments described herein. Those of ordinary skill in the art will readily recognize that the features of a particular aspect or embodiment may be used in conjunction with the features of any or all of the other aspects or embodiments described in this disclosure.

FIGS. 4A and 4B illustrate side views of exemplary air acceleration elements, according to aspects of this disclosure.

FIG. 9 illustrates an additional exemplary air acceleration trailer system, according to further aspects of this disclosure.

FIG. 10 illustrates a top view of a portion of the air acceleration trailer system of FIG. 9, according to aspects of this disclosure.

FIG. 11 illustrates a side view of a portion of the air acceleration trailer system of FIG. 9, according to aspects of this disclosure.

FIG. 12 illustrates a cross-section view of a portion of the air acceleration trailer system of FIG. 9, according to aspects of this disclosure.

FIGS. 15A and 15B illustrate cross-section views of exemplary air acceleration elements, according to aspects of this disclosure.

FIGS. 16A and 16B illustrate cross-section views of additional exemplary air acceleration elements, according to aspects of this disclosure.

DETAILED DESCRIPTION

Examples of the present disclosure relate to devices and systems configured to improve vehicular energy efficiency. The devices and systems may be used to improve aerodynamics by reducing drag, and thus improving fuel efficiency.

Reference will now be made in detail to examples of the present disclosure described above and illustrated in the accompanying drawings. Wherever possible, the same reference numbers will be used throughout the drawings to refer to the same or like parts.

Figure 1:
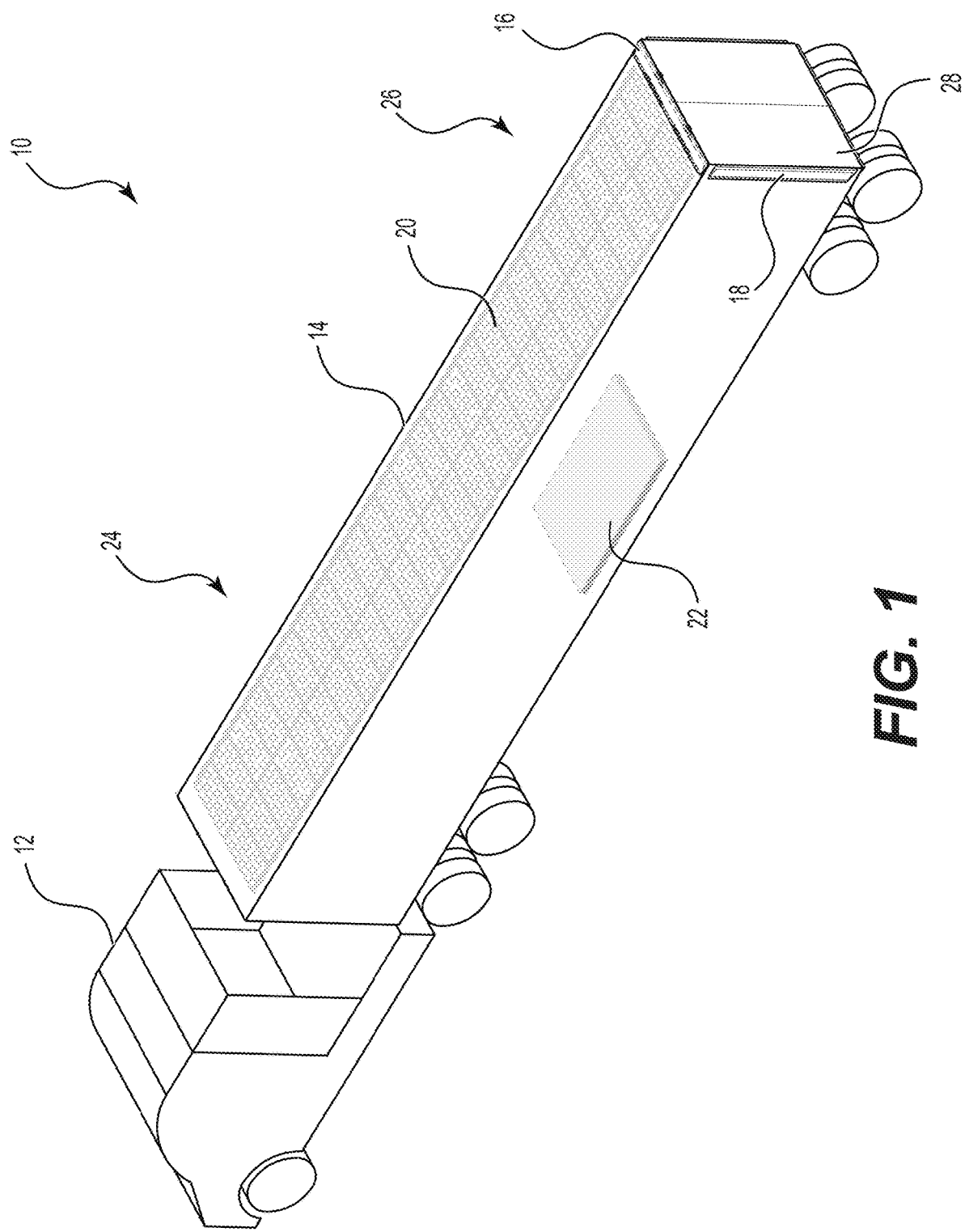
FIG. 1 illustrates an exemplary air acceleration trailer system, according to aspects of this disclosure.

According to aspects, as detailed in FIG. 1, a trailer system 10 may include a tractor or cab 12 and a trailer 14, with a plurality of air speed devices or fans 16 mounted on or otherwise positioned on trailer 14. Fans 16 may be arranged in one or more groups or bands 18. Trailer system 10 may also include one or more solar panels 20 and/or a battery pack 22.

Cab 12 may be a tractor-trailer type cab, which may be powered by a diesel engine, electric engine, hybrid engine, or any other power source. Cab 12 may include any appropriate coupling to trailer 14. The coupling may include an electrical connection as well, such that electricity and other signals may be transmitted between cab 12 and trailer 14.

Trailer 14 may be any appropriate trailer, either integral with cab 12 or otherwise coupled to cab 12 such that cab 12 may pull trailer 14. Trailer 14 includes a front portion 24 and a rear portion 26, with front portion being closer to cab 12 and rear portion 26 being farther away from cab 12.

While the present disclosure and drawings are described in the context of semi- or tractor-trailer-type trucks, it should be appreciated that the presently disclosed devices and systems may be applicable to any moving vehicle, ranging from passenger cars, including SUVs and buses, to freight trains or locomotives. Moreover, the presently disclosed devices and systems may be applicable to any type of cargo trucks, including box-type trucks, delivery vans, or the like.

As mentioned, fans 16 may be arranged in one or more bands 18, and may be mounted on or otherwise coupled to trailer 14. Fans 16, which may also be other pump devices, may redirect and/or accelerate air passing over or around trailer 14. Fans 16 may be mounted on an existing trailer 14, or may be integrally produced with trailer 14. Bands 18 of fans 16 may be positioned on a top, both sides, and a bottom of trailer 14. As shown in FIG. 1, bands 18 of fans 16 may be positioned at rear portion 26 of trailer 14. Fans 16 may be arranged such that one band 18 is on the top, one band 18 is on each side, and one band 18 is on the bottom of trailer 14. Alternatively, multiple bands 18 of fans 16 may be positioned on the top, each side, and the bottom of trailer 14.

One or more solar panels 20 may be positioned on the top of trailer 14, and battery pack 22 may be positioned within or mounted on, for example, the bottom or underside, of trailer 14. Solar panels 20 and battery pack 22 may be electrically coupled to fans 16 to generate and/or deliver power to operate fans 16. Solar panels 20 may also be electrically coupled to battery pack 22 to store collected energy to be saved for later use. Solar panels 20 and battery pack 22 may allow for fans 16 to be operated separate from the engine and other electrical components of cab 12.

Furthermore, solar panels 20 and battery pack 22 may be electrically coupled to cab 12 to deliver energy to power electrical components of cab 12, potentially reducing the fuel and battery consumption of cab 12.

Figure 3:
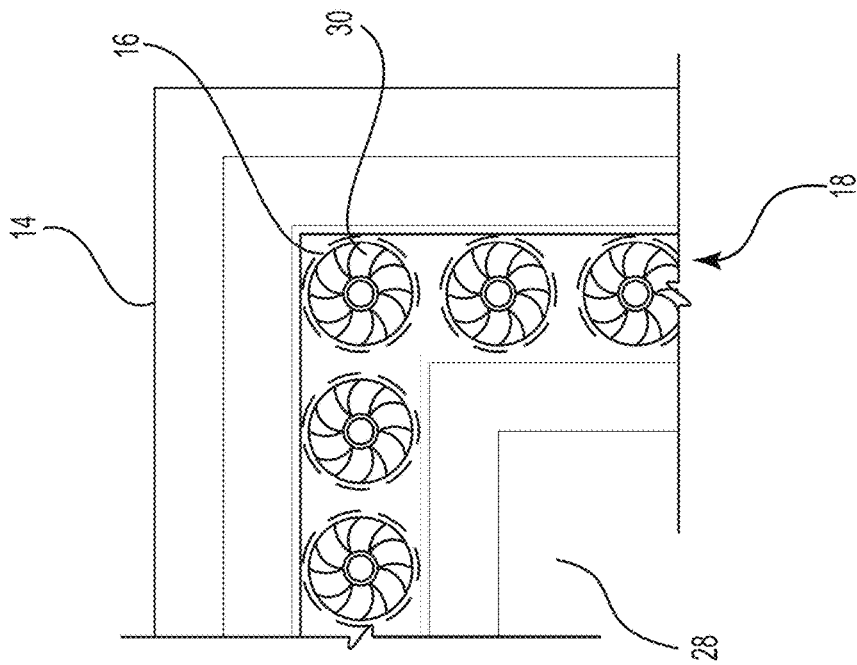
FIG. 3 illustrates a portion of the rear view of the exemplary air acceleration trailer system of FIG. 2, according to aspects of this disclosure.
Figure 2:
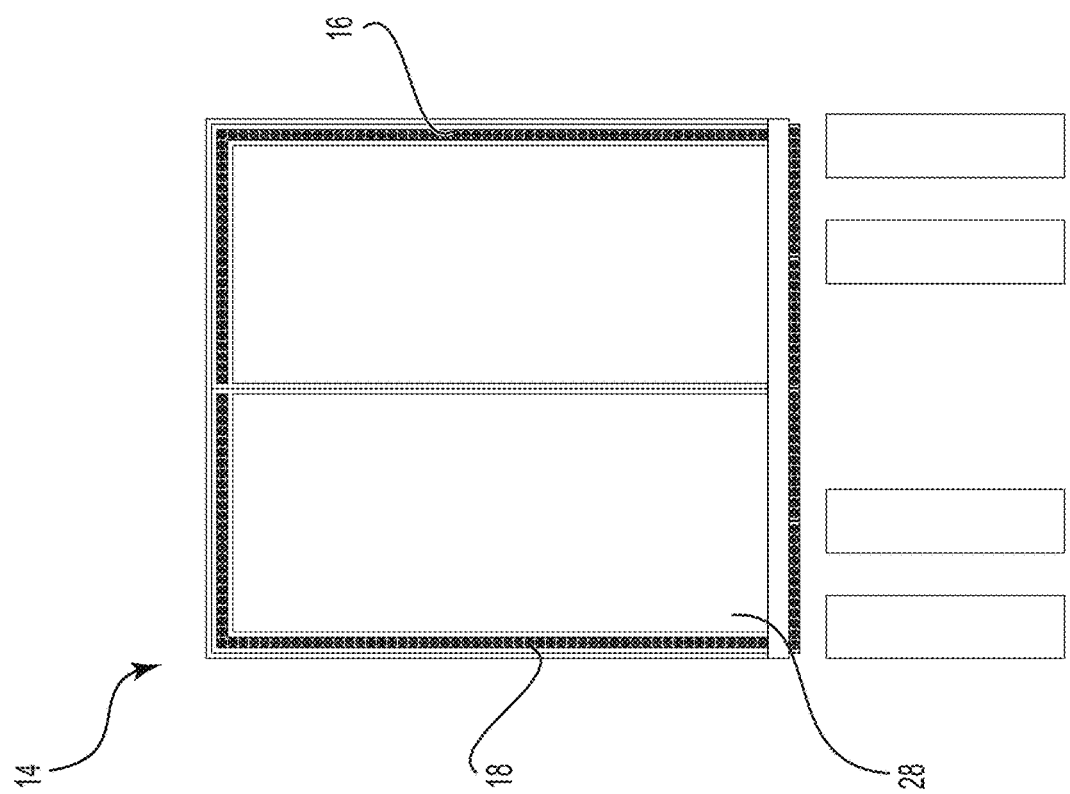
FIG. 2 illustrates a rear view of an exemplary air acceleration trailer system, according to aspects of this disclosure.

As shown in FIGS. 2 and 3, in one aspect, fans 16 may be positioned in the same plane as a rear face 28 of trailer 14. Rear face 28 may include at least one door, and fans 16 may be integral with the at least one door, or may be positioned around a perimeter or an exterior of the at least one door. In this aspect, although not shown, fans 16 may include an inlet duct for air to be taken in and accelerated by fans 16. Fans 16 may include one or more blades 30, which may be powered by small electric motors. Blades 30 may be relatively small, rigid, rotating blades, and may be integrated into a groove or channel in order to ensure aerodynamic efficiency. In an example, each fan 16 may include one, two, three, four, or even a multitude of blades 30. Each blade 30 may be made from a light, but strong material, including, for example, carbon fiber, graphite fiber, plastic, or other similar materials.

FIGS. 4A and 4B illustrate cross-section views of various types of fans 16. FIG. 4A includes fan 16 in a manifold or housing 32. Housing 32 may include an attachment or hole 34 for a bolt or other element to secure housing 32 to trailer 14, and although not shown, hole 34 may be threaded. For example, bands 18 of fans 16 may be bolted to trailer 14, as shown in FIG. 1, to retrofit trailer 14 with fans 16. Each fan 16 may be separately secured to trailer 14 using, for example, bolts, screw, or welding, or band 18 of fans 16 may be secured to trailer 14. Housing 32 may also include one or more screens 36, for example, on one or both of front and back sides of fan 16. Screens 36 may protect fan 16 and/or ensure that debris or other materials do not interfere with fan 16 and blades 30. Housing 32 may also contain the electric motor and other elements that power blades 30. Housing 32 may further include a securing element 38 to couple a top portion 40 to a bottom portion 42. As shown in FIG. 4B, fan 16' may be a scroll fan or centrifugal fan. System 10 may include a mixture of fans 16 with blades 30 and scroll fans 16'.

Figure 5A:
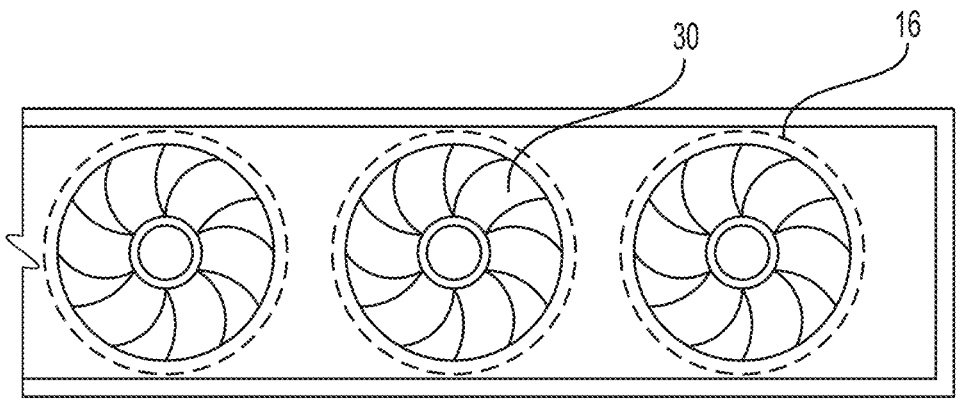
FIGS. 5A and 5B illustrate cross-section views of exemplary air acceleration elements, according to aspects of this disclosure.
Figure 5B:
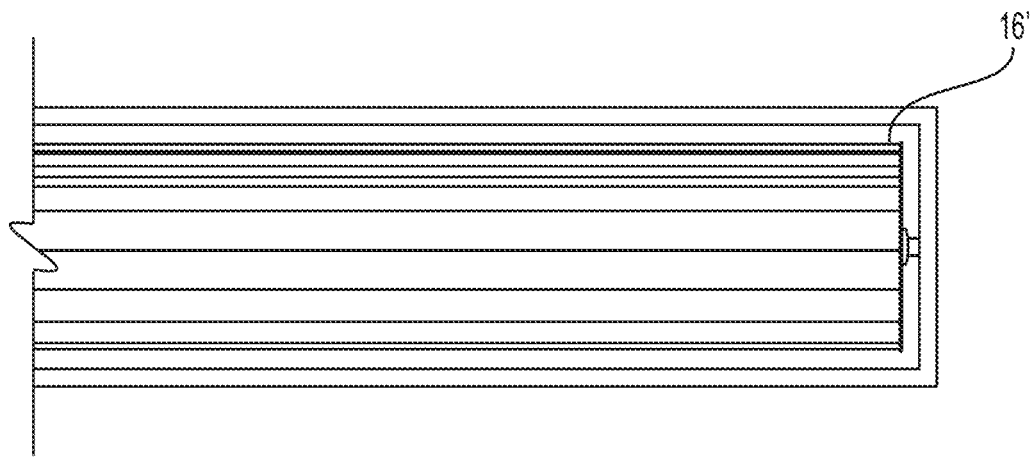
Figure 6A:
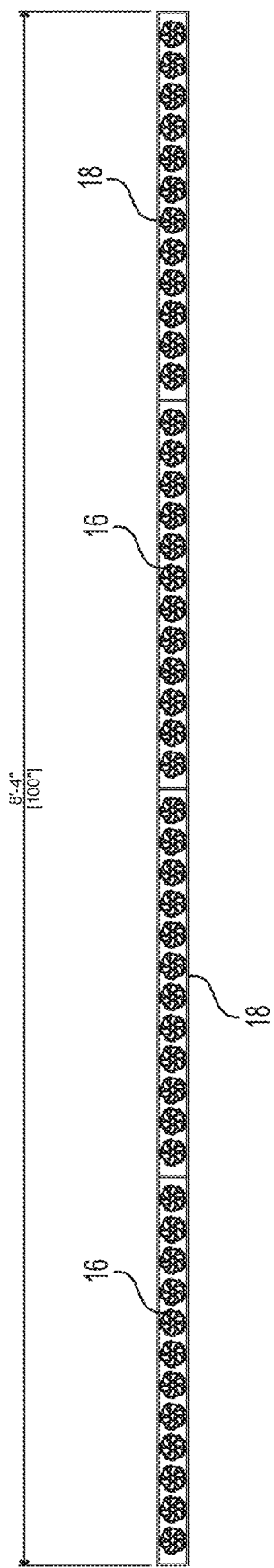
FIGS. 6A and 6B illustrate end views of exemplary air acceleration elements, according to aspects of this disclosure.
Figure 6B:
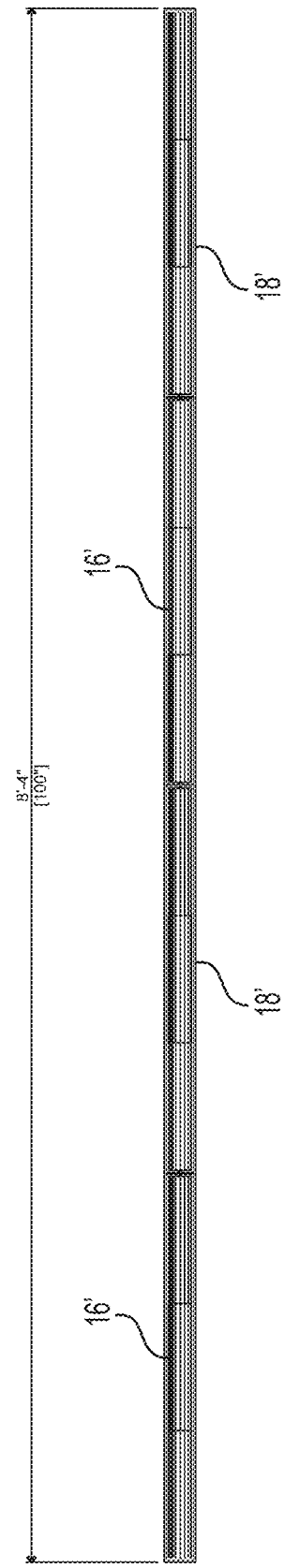

FIGS. 5A and 5B illustrate end views of a plurality fans 16 and a portion of fan 16', respectively. FIGS. 6A and 6B illustrate a plurality of bands 18 and 18' of fans 16 and 16'. As shown in FIG. 6A, band 18 may include, for example, twelve fans 16, and four bands 18 may be positioned on, for example, a top side of trailer 14. Four bands 18 may be approximately 2.54 meters (100 inches), and may correspond to the top side of trailer 14. As shown in FIG. 6B, a band 18' may include, for example, three scroll fans 16', and four bands 18' may be positioned on, for example, a top side of trailer 14. Four bands 18' may be approximately 2.54 meters (100 inches), and may correspond to the top side of trailer 14. In both FIGS. 6A and 6B, although not shown, solar panels 20, may be included above or in front of bands 18, 18' along the length of trailer 14, or may be otherwise positioned on trailer 14 as discussed above.

The operation of fans 16 may aid in reducing drag and/or achieve aerodynamic braking, thus improving fuel efficiency. If fans 16 are employed to direct and/or accelerate air toward the rear of trailer 14 or straight back behind trailer 14, trailer 14 may move more efficiently through the air. Furthermore, fans 16 may be angled to direct air toward the center of the rear of the trailer 14, that is, with fans 16 on a top of trailer 14 directed downward, fans 16 on the sides of trailer 14 directed inward, and fans 16 on a bottom of trailer 14 directed upward. Fans 16 on the four sides of trailer 14 may direct air in a cone-like shape, which may help trailer 14 to move more efficiently through the air. If fans 16 are employed to direct and/or accelerate air toward the front of trailer 14, trailer 14 may brake more efficiently and/or reduce wear on the brakes and other components in cab 12 and trailer 14. Additionally, deactivating fans 16 may aid in braking and/or assist trailer system 10 to slow down by increasing the pressure drag on trailer 14. For example, fans 16 may be electrically coupled to a brake pedal or cruise control setting within cab 12 such that fans 16 are automatically deactivated when the brake pedal is depressed or the cruise control speed is decreased.

Trailer system 10 may further include at least one sensor, for example, an air or wind speed sensor to measure the speed at which trailer system 10 moves relative to the air. The at least one sensor may be operably coupled to fans 16, for example, to the motor of fans 16. The power generated by the motors and/or the speed at which the blades 30 move may be correlated to the values measured by the sensors. In one aspect, fans 16 may include programming and/or a controller configured to control fans 16 based on the values measured by the sensors. For example, based on the values measured by a wind speed sensor, the power and/or speed of fans 16 may be adjusted. Specifically, if trailer system 10 is facing a head wind, the power and/or speed of fans 16 may be greater than if trailer system 10 is in a tail wind. This may be the case even if trailer system 10 is traveling at the same ground speed. By controlling fans 16 in relation to a detected or sensed wind speed, trailer system 10 may experience a reduced pressure drag, which may help reduce fuel burn or power consumption.

Figure 7:
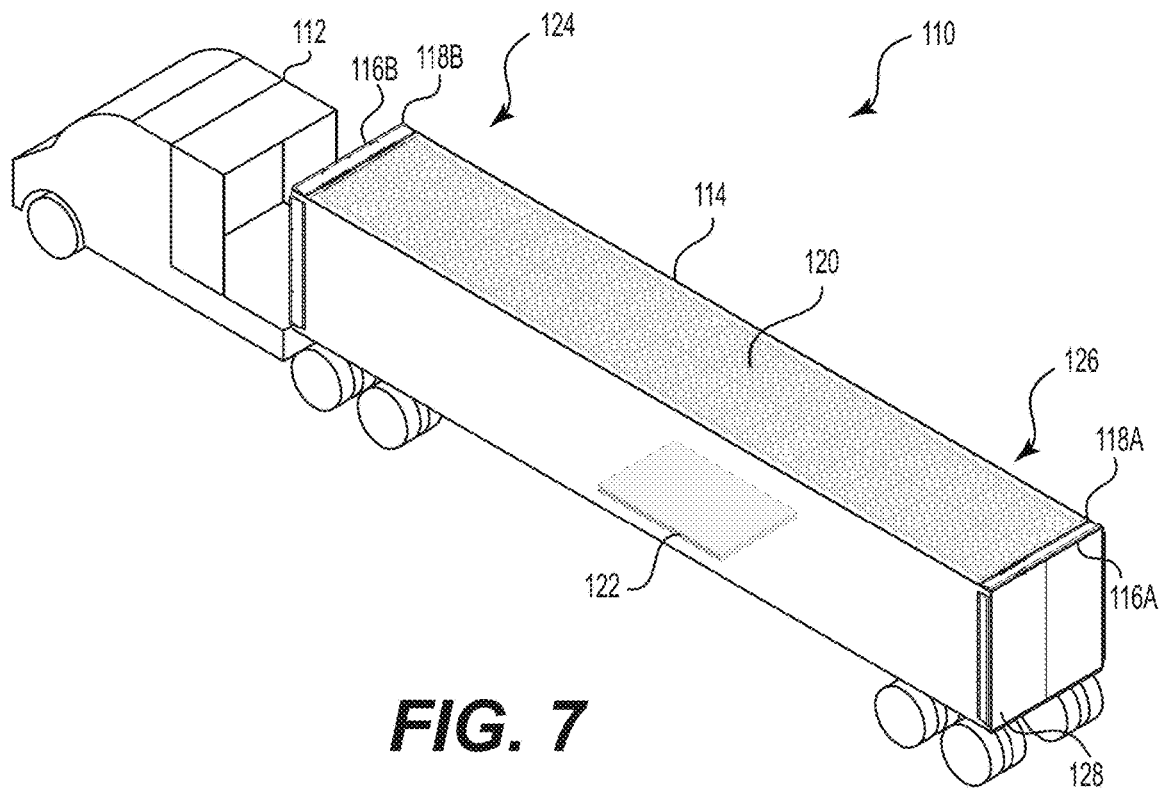
FIG. 7 illustrates an additional exemplary air acceleration trailer system, according to further aspects of this disclosure.

FIG. 7 illustrates an alternative example with similar elements to trailer system 10 shown by 100 added to the reference numbers. This aspect includes a trailer system 110 with a truck or cab 112, trailer 114, one or more solar panels 120, and a battery pack 122. Trailer system 110 may include two sets of bands 118A, 118B of fans 116A, 116B mounted on or otherwise coupled to trailer 114. In this aspect, fans 116A may be attached to rear portion 126 of trailer 114, and may be configured to direct air toward the rear of trailer 114. Fans 116A may reduce the drag on trailer 114, and may help to improve fuel efficiency. Fans 116B may be attached to front portion 124 of trailer 114, and be configured to direct air toward the front of trailer 114. Fans 116B may assist in braking, which may help to reduce wear on the brakes and other components. As discussed above, fans 116A, 116B, and 116C may be electrically coupled to a brake pedal or cruise control setting within cab 112 to selectively and/or automatically control fans 116A, 116B, and 116C.

Figure 8:
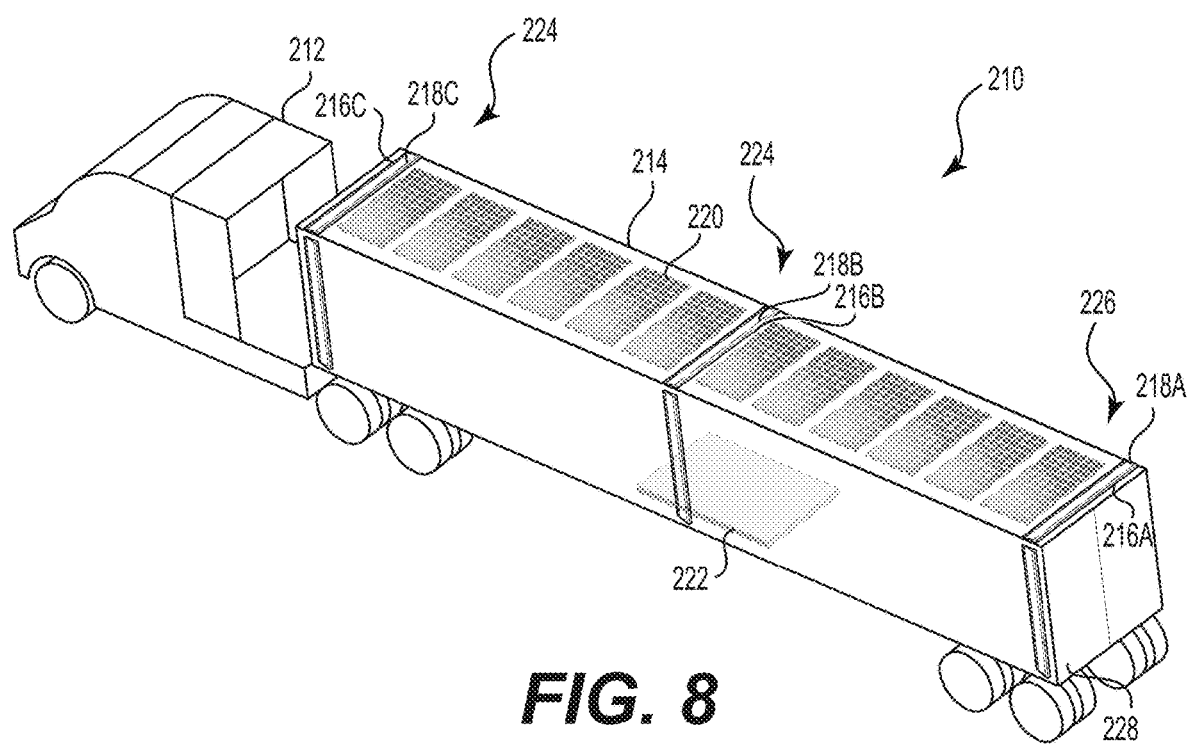
FIG. 8 illustrates an additional exemplary air acceleration trailer system, according to further aspects of this disclosure.

FIG. 8 illustrates an alternative example with similar elements to trailer system 10 shown by 200 added to the reference numbers. This aspect includes a trailer system 210 with a truck or cab 212, trailer 214, one or more solar panels 220, and a battery pack 222. It is noted that, as shown in FIG. 8, solar panels 220 may be discrete sets of solar panels, or may be continuous solar panels (FIGS. 1 and 7). Trailer system 210 may include three sets of bands 218A, 218B, 218C of fans 216A, 216B, 216C mounted on or otherwise coupled to trailer 214. In this aspect, fans 216A may be attached to rear portion 226 of trailer 214. Fans 216B may be attached to a middle portion 244 of trailer 214, and fans 216C may be attached to front portion 224 of trailer 214. Fans 216A, 216B, and 216C may all be configured to direct air toward the rear of trailer 214, and may reduce the drag on trailer 214, which may help to improve fuel efficiency. Alternatively, fans 216A and fans 216B may direct air toward the rear of trailer 214, and fans 216C may direct air toward the front of trailer 214.

Turning now to FIGS. 9-12, the figures illustrate a further alternative example of an aerodynamic device for moving vehicles, with similar elements to trailer system 10 shown by 300 added to the reference numbers. As such, this aspect includes a trailer system 310 with a truck or cab 312, trailer 314, one or more solar panels 320, and a battery pack 322. Furthermore, trailer 314 may include a opening 346, which internally directs airflow to interior, ducted fans 316. As discussed above, fans (not shown) may be coupled to an exterior of trailer 314 and/or embedded in the walls of the trailer 314. In one aspect, fans 316 may be embedded in the exterior walls of the trailer around a perimeter of the rear of trailer 314 in rear portion 326 or rear face 328.

As shown in FIG. 9, opening 346 may be positioned along a length of trailer 314. Opening 346 may be positioned mid-way in the length of trailer 314, or opening 346 may be positioned between middle portion 344 and rear portion 326 proximate to rear end 328 of trailer 314. For example, opening 346 may be positioned approximately three-quarters or seven-eighths of the way from front to rear of trailer 314. As shown in FIGS. 10, 11, and 12, opening 346 may be a longitudinal opening in the top, sides, bottom, or any portion of trailer 314. Opening 346 may connect to fans 316 through one or more internal ducts 348 (shown in FIGS. 10, 11, and 12) within the portion of trailer 314 between opening 346 and fans 316. Opening 346 may allow for air intake such that the air taken in may be selectively accelerated by fans 316 toward the rear of trailer 314 to reduce skin friction and/or pressure drag, which may aid in improving fuel efficiency as discussed above. Furthermore, fans 316 may be angled to more effectively direct the air. Alternatively or additionally, fans 316 may direct air toward the front of trailer 314, which may aid in achieving aerodynamic braking. Moreover, deactivating fans 316 may aid in braking and/or assist trailer system 310 to slow down by increasing the pressure drag on trailer 314. For example, fans 316 may be electrically coupled to a brake pedal or cruise control setting within cab 312 such that fans 316 are automatically deactivated when the brake pedal is depressed or the cruise control speed is decreased.

Figure 13:
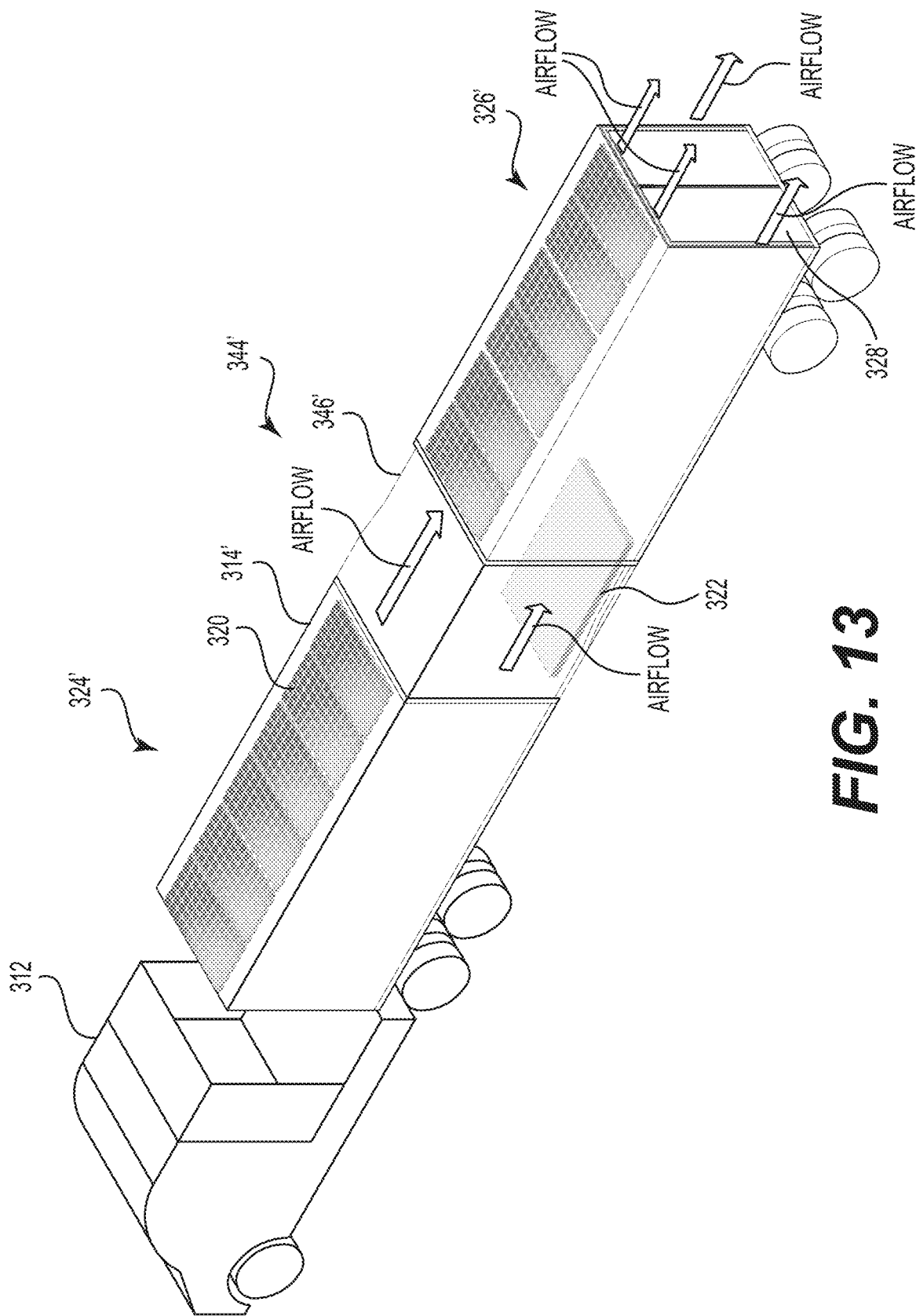
FIG. 13 illustrates an additional exemplary air acceleration trailer system, according to further aspects of this disclosure.
Figure 14:
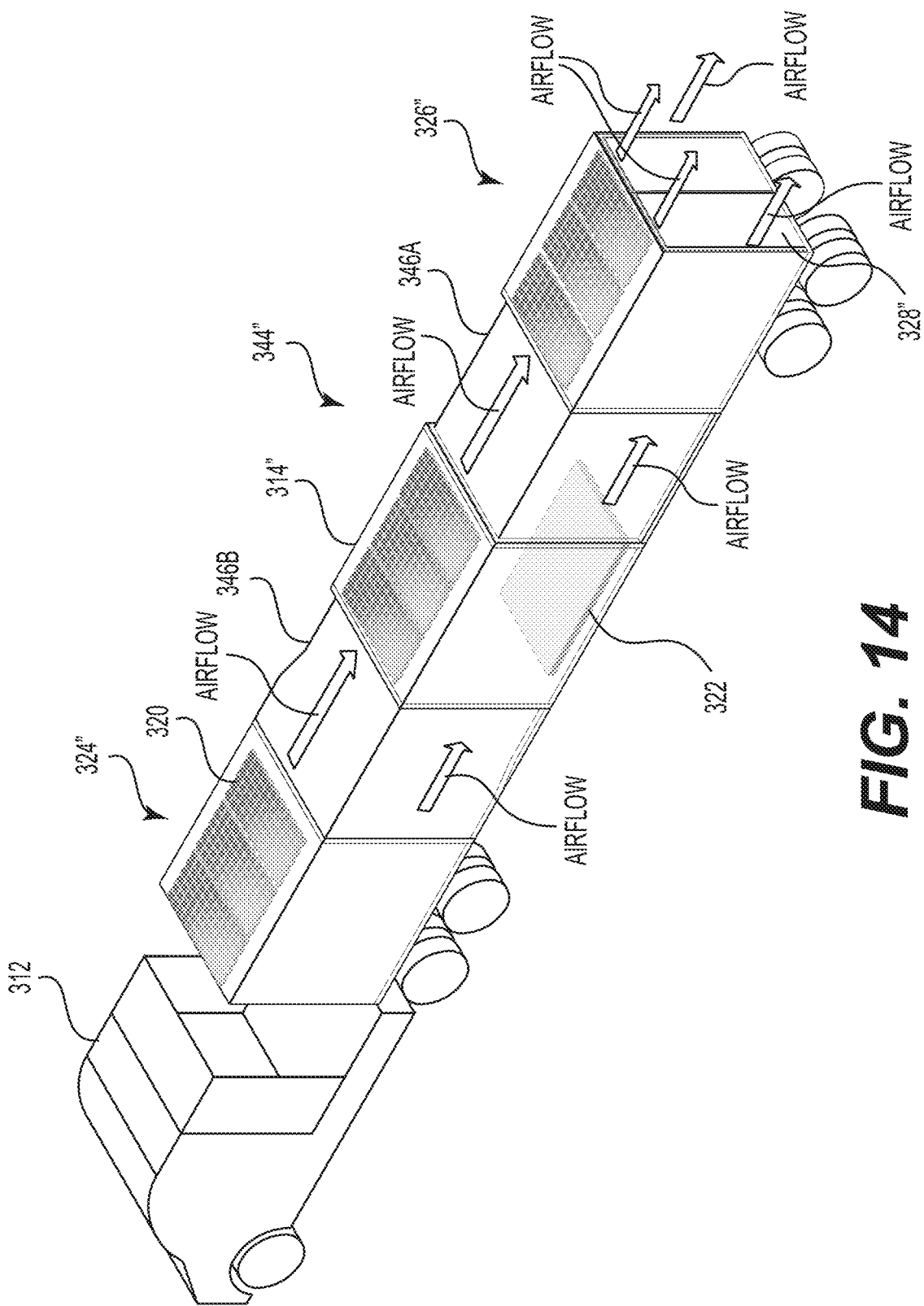
FIG. 14 illustrates an additional exemplary air acceleration trailer system, according to further aspects of this disclosure.

FIGS. 13 and 14 illustrate alternative positions of opening 346' in trailer 314' and openings 346A and 346B in trailer 314", respectively. As shown in FIG. 13, opening 346' may be positioned in middle portion 344' of trailer 314'. As shown in FIG. 14, opening 346A may be positioned between middle portion 344" and rear portion 326" of trailer 314", and opening 346B may be positioned between middle portion 344" and front portion 324". Trailer 314 may include any number of longitudinal openings 346 along the length of trailer 314. Openings 346 may be evenly or unevenly distributed along the length of trailer 314, and the plurality of openings 346 may allow for air intake such that the air taken in may be selectively accelerated by fans 316 embedded in the walls and/or on the exterior of trailer 314. Again, fans 316 may be selectively angled to achieve aerodynamic braking and/or aid in reducing skin friction and pressure drag, thus improving fuel efficiency. Moreover, the one or more openings along the length of the trailer may be connected to each other via, for example, ducts, or may otherwise cooperate and/or work in conjunction with each other.

In the example shown in FIG. 14, trailer 314" may include a series of fans or pumps embedded in the walls of trailer 314". The series of fans or pumps may be embedded in the walls between opening 346A and opening 346B, and may also be embedded in the walls of trailer 314 to the rear of opening 346A. Opening 346B may intake air, and fans 316 or pumps between opening 346B and opening 346A may accelerate the air before the air exits at the front of opening 346A. Opening 346A may also intake air, and fans 316 or pumps between opening 346 and the rear of the trailer 326" may accelerate the air before the air exits at the rear of trailer 314. Alternatively, opening 346B and its fans 316 or pumps may intake air and accelerate the air all the way to the rear of trailer 314, with opening 346A and its fans or pumps taking in and accelerating more air to the rear of trailer 314. The aforementioned openings 346, 346', 346A, 346B and fans 316 or pumps both pull or suck air in and push or accelerate air out.

FIGS. 15A and 15B illustrate additional air acceleration and direction elements that may be incorporated in any of the aforementioned trailer systems 10, 110, 210, and 310, with similar elements to trailer system 10 shown by 400 added to the reference numbers. FIGS. 15A and 15B are cross-section views of exemplary rear portions 426 of trailer 414. As shown in FIG. 15A, fan 416 may be embedded in rear portion 426 of trailer 414. As shown in FIG. 15B, scroll fan 416' may be embedded in rear portion 426 of trailer 414. In both Figures, duct 448 may connect fans 416, 416' to an opening (not shown) as in FIGS. 9-14. Trailer 414 may include a curved wing or projection 450, which may extend from the top of the rear end of trailer 414. Projection 450 may be curved and may extend at approximately a forty-five degree angle from the top of the rear end of the trailer 414 or from within duct 448. Projection 450 may be pivotable. For example, if fan 416 is not directing air toward the rear of trailer 414, projection 450 may hang approximately straight down, but if fan 416 is directing air toward the rear of trailer 414, projection 450 may pivot up to the approximately forty-five degree angle. Alternatively, projection 450 may be fixed at an angle. As illustrated in FIGS. 15A and 15B, projection 450 may direct the air from fans 416, 416' toward a center of rear end 428 of trailer 414. Directing the air from fans 416, 416' may assist in recovering the pressure at the rear of trailer 414, which may aid in reducing drag and improving fuel efficiency. Projections 450 may also be incorporated on all four sides of trailer 414 to direct air toward the center of the rear of trailer 414, for example, in a cone-like shape.

FIGS. 16A and 16B illustrate additional air acceleration and direction elements that may be incorporated in any of the aforementioned trailer systems 10, 110, 210, and 310, with similar elements to trailer system 10 shown by 500 added to the reference numbers. FIGS. 16A and 16B are cross-section views of exemplary rear portions of trailer 514, and fan 516 or scroll fan 516' may be embedded in the rear portions of trailer 514, respectively, and curved wings or projections 550 may be coupled to trailer 514 to direct air, as discussed above. Fans 516, 516' may intake air from ducts 548. In addition, trailer 514 may include a protraction or scoop 552, which may be an angled extension that extends away from duct 548 and includes an intake opening facing toward the front of trailer 514. In this aspect, as trailer 514 moves through the air, air may enter protraction 552, travel through duct 548, and be accelerated toward the rear of trailer 514 by fans 516, 516'.

In a further aspect, protraction 552 may be pivotable or hinged from a position in line with the top of trailer 514, with the ducts 548 closed, to the position shown in FIGS. 16A and 16B. For example, protraction 552 may be automated, such that protraction 552 may extend upward when trailer 514 is moving at a specific speed, for example, at least ten miles per hour, at least twenty miles per hour, at least thirty miles per hour, at least forty miles per hour, at least fifty miles per hour, etc. Alternatively, protraction 552 may be coupled to a user input, for example, positioned in cab 12, such that an operator may extend protractions 552 when the operator deems fit or necessary. If protraction 552 is pivotable, ducts 548 and fans 516, 516' may be protected from debris and other elements when not in operation. Moreover, at low speeds, it may be more fuel efficient to close protractions 552 for trailer 514 to have a streamlined top. Alternatively, at higher speeds, it may be more fuel efficient to open protractions 552 and operate fans 516, 516' and direct air to the rear of trailer 514 and recover the pressure at the rear of trailer 514, reducing drag, etc. Furthermore, protractions 552 may include screens to ensure debris does not enter ducts 548. Protractions 552 may also be incorporated on all four sides of trailer 514 to intake air, and projections 550 may direct air toward the center of the rear of trailer 514, for example, in a cone-like shape.

Figure 17:
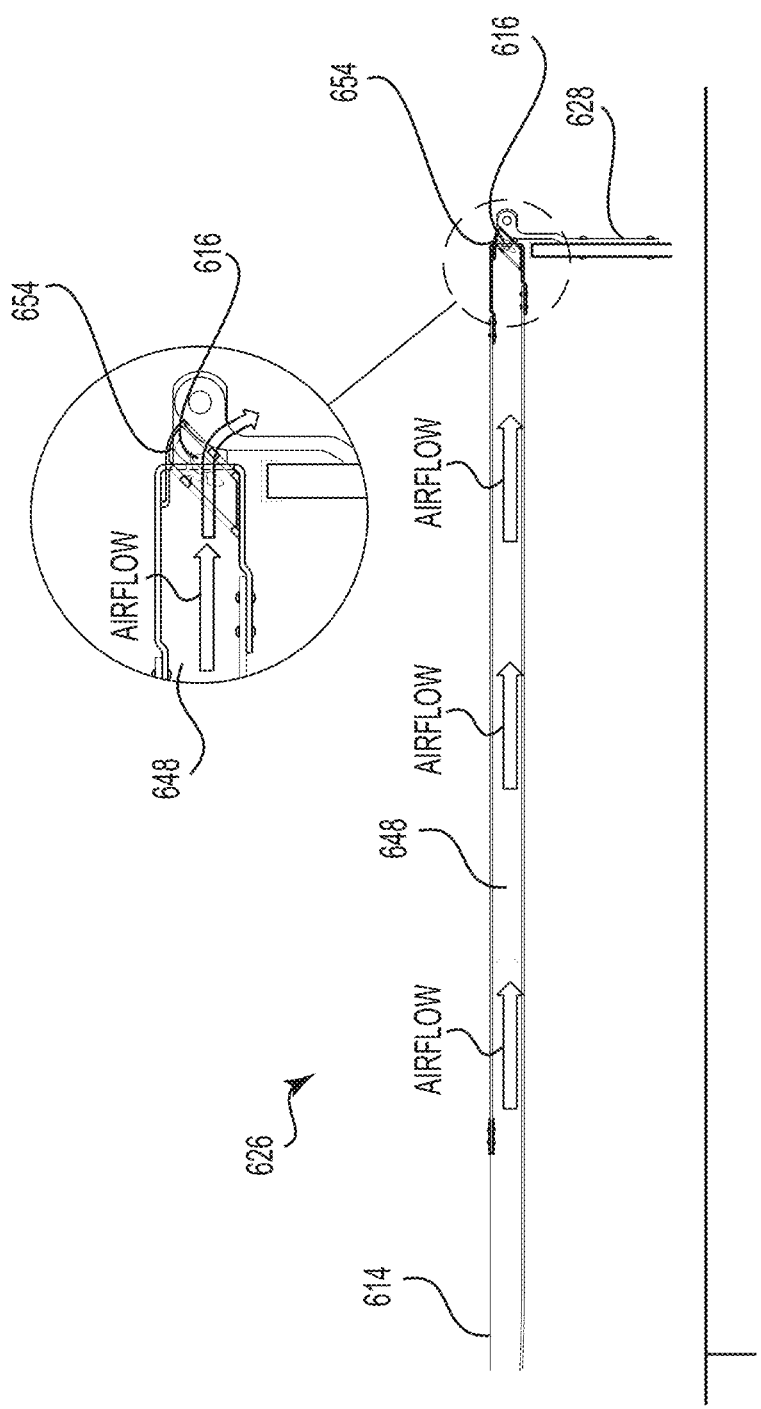
FIG. 17 illustrates a cross-section view of an exemplary air acceleration element, according to aspects of this disclosure.

FIG. 17 illustrates additional air acceleration and direction elements that may be incorporated in any of the aforementioned trailer systems 10, 110, 210, and 310, with similar elements to trailer system 10 shown by 600 added to the reference numbers. FIG. 17 is a cross-section view of an exemplary rear portion 626 of trailer 614, in which a fan 616 may be embedded in the wall of trailer 614, for example, in rear face 628. Fan 616 may intake air through duct 648 as discussed with any of the previously discussed embodiments, which may include a protraction as discussed with respect to FIG. 16A. As shown in FIG. 17, fan 616 may be angled from a longitudinal axis of trailer 614. For example, fan 616 may be positioned at approximately a forty-five degree angle. An angled fitting 654 may be coupled to at least one of fan 616 and/or rear face 628 of trailer 614. Angled fitting 654 may retain fan 616 at the angle. Moreover, the position and/or angle of fan 616 may be adjustable. For example, as discussed above with respect to protraction 552, when trailer 614 is not in motion or is traveling at low speeds, fan 616 maybe positioned within duct 648, and angled fitting 654 may close to protect fan 616. At higher speeds, or based on user input, fan 616 may be angled and extend out of duct 648 to accelerate and direct air toward the rear of trailer 614 and downward toward a center of trailer 614.

Although the aspects of the foregoing figures were discussed with respect to fans 16, 16', 116A, 116B, 216A, 216B, 216C, 416, 416', 516, 516', and 616 positioned on a top portion of trailers 14, 114, 214, 314, 314', 314", 414, 514, and 614, the features may be employed at any position on the trailers. In particular, the fans may be positioned on all four sides of the trailers. For example, fan 416 and projection 450 may be positioned on the sides and/or bottom of trailer 414 and positioned to accelerate and direct air toward the rear of trailer 414 and either to the sides or upward toward the center of trailer 414. Trailer 514 may include protractions 552 on the sides and/or bottom of trailer 514 to intake air to be accelerated and directed by fans 516. Similarly, fan 616 and angled fitting 654 may be positioned on the sides and/or bottom of trailer 614 and positioned to accelerate and direct air toward the rear of trailer 614 and either to the side or upward toward a center of trailer 614. Moreover, the air accelerated by the fans on all four sides may be directed toward the center of the trailers, for example, in a cone-like shape In the above examples, changing the airspeed of the air surrounding trailer 14, 114, 214, 314, 414, 514, and 614 may assist in reducing skin friction by impacting the fluid boundary layer on the sides of the trailer to reduce the drag on the trailer. The above examples may also assist in reducing the pressure drag by recovering the pressure at the rear of the trailer by pushing air out of the rear and/or directing the air toward the center.

In one aspect, opening(s) 346 and/or protractions 552 along the length of the trailer may intake air and, through the series of fans or other pumps, the air may be pulled into trailer 14, 114, 214, 314, 414, 514, and 614 and accelerated out of the rear of trailer 14, 114, 214, 314, 414, 514, and 614. The direction and angle of the accelerated air out of the rear of trailer 14, 114, 214, 314, 414, 514, and 614 may be selectively adjusted, as discussed. In one example, the air accelerated out of the rear of trailers 14, 114, 214, 314, 414, 514, and 614 may be directed at multiple angles, particularly, inward in a cone-like shape.

Furthermore, it is noted that any of the aforementioned fans or fan-type devices may include any pump-type devices to accelerate fluid, i.e., air. For example, the pump-type devices may comprise motors, jets, propellers, any device that accelerates fluid, or any combination thereof. Moreover, it is further noted that the systems discussed above may be powered by any power supply, including the vehicle's own power. For example, a device that significantly reduces the drag on a vehicle and uses minimal power may be powered by the vehicle's power without creating a parasitic load. Similarly, the systems discussed above may be powered by solar panels 20, battery pack 22, the vehicle's own power, or any combination thereof. Additionally, the speed of or power supplied to the fan or pump-type devices may be controlled and increased or decreased based on the vehicle speed to conserve power usage.

In an aspect discussed with respect to FIG. 7, the fan or pump-type devices mounted on the exterior of trailer 114 may accelerate air towards the front of trailer 112, rather than towards the rear of trailer 112. In one example of this aspect, one series of fan or pump-like devices may be mounted on the exterior of the front portion of the trailer and may accelerate air towards the front of the trailer. Accelerating air towards the front of trailer 112 may assist in reducing skin friction drag. A different series of fan or pump-like devices may be mounted on the exterior of the rear portion of trailer 112, or within a rear opening, to accelerate air out of the rear of trailer 112. Accelerating air out of the rear of trailer 112 may assist in recovering the pressure at the rear of the trailer, as discussed in more detail above.

The aforementioned aspects may help to achieve increased truck freight energy efficiency (reduced fuel burn or low consumption of any energy source), which may allow for faster and cheaper shipping for consumers and faster lead times for business-to-business customers, as well as increases in federal regulation standards. Addressing drag may increase efficiency with the systems discussed above and may reduce fuel burn or other energy consumption for vehicles of all sizes. Furthermore, including solar panels in the trailer systems discussed herein may harness significant solar power, as trailers and most vehicles operate almost exclusively in the outdoors. As such, the power necessary from the vehicle's own power supply may be significantly reduced. Nevertheless, including a battery pack may further provide energy stored by the solar panels when the solar panels are not generating sufficient energy, for example, at night, on cloudy days, etc. As such, the systems and features discussed above may reduce fuel burn, while also not significantly impacting the efficiency of the vehicle's own power systems.

While principles of the present disclosure are described herein with reference to illustrative examples for particular applications, it should be understood that the disclosure is not limited thereto. Those having ordinary skill in the art and access to the teachings provided herein will recognize additional modifications, applications, embodiments, and substitution of equivalents all fall within the scope of the features described herein. Accordingly, the claimed features are not to be considered as limited by the foregoing description.

What is claimed is:

1. A vehicle or trailer assembly, comprising:
    two or more openings along a length of the vehicle or trailer assembly, wherein the two or more openings are inset into an exterior of the vehicle or trailer assembly, and wherein at least one of the two or more openings connects to a rear of the vehicle or trailer assembly; and
    at least one fan or pump embedded in walls or exterior of the vehicle or trailer assembly between the two or more openings, wherein the at least one fan or pump is embedded in the walls or connected to the exterior along a top edge or at least one side edge of the vehicle or trailer assembly.

2. The vehicle or trailer assembly of claim 1, wherein at least one of the two or more openings is connected to the rear of the vehicle or trailer assembly through one or more ducts.

3. The vehicle or trailer assembly of claim 2, wherein the one or more ducts are inset within a side wall, a bottom wall, or a top wall of the vehicle or trailer assembly.

4. The vehicle or trailer assembly of claim 2, wherein the one or more ducts are positioned external to a side wall, a bottom wall, or a top wall of the vehicle or trailer assembly.

5. The vehicle or trailer assembly of claim 2, wherein the at least one fan or pump includes a plurality of fans embedded in the walls or the exterior of the vehicle or trailer assembly around a rear face of the vehicle or trailer assembly.

6. The vehicle or trailer assembly of claim 5, wherein each fan of the plurality of fans directs air at an angle relative to a longitudinal axis of the vehicle or trailer assembly such that the plurality of fans direct air out of the rear of the vehicle or trailer assembly in a cone-like shape.

7. The vehicle or trailer assembly of claim 2, wherein the at least one fan or pump includes a plurality of fans or pumps positioned on a top or sides of the rear of the vehicle or trailer assembly, and wherein at least one of the openings connects to the plurality of fans or pumps via the ducts.

8. The vehicle or trailer assembly of claim 1, further including a projection configured to direct air from the at least one fan or pump toward a center of the trailer.

9. The vehicle or trailer assembly of claim 8, wherein the projection is pivotable.

10. A vehicle or trailer assembly, comprising:
    two or more openings along a length of the vehicle or trailer assembly, wherein the two or more openings are inset into an exterior of the vehicle or trailer assembly and are spaced apart along the length of the vehicle or trailer assembly;
    one or more fans or pumps embedded in or coupled to walls or exterior of the vehicle or trailer assembly, wherein at least one fan or pump of the one or more fans or pumps is positioned between two of the two or more openings along the length of the vehicle or trailer assembly; and
    at least one duct connecting at least one opening of the two or more openings to the at least one fan or pump, wherein the at least one fan or pump redirects or accelerates air moving over, around, or through the exterior of the vehicle or trailer assembly.

11. The vehicle or trailer assembly of claim 10, wherein the at least one duct extends parallel to a direction of travel of the vehicle or trailer assembly.

12. The vehicle or trailer assembly of claim 10, wherein the two or more openings are inset into an exterior of the vehicle or trailer assembly, and wherein at least one of the two or more openings connects to a rear of the vehicle or trailer assembly via the at least one duct.

13. The vehicle or trailer assembly of claim 10, wherein the one or more fans or pumps are embedded in the walls or connected to the exterior along a top edge or at least one side edge of the vehicle or trailer assembly.

14. The vehicle or trailer assembly of claim 10, wherein the one or more fans or pumps includes a plurality of fans or pumps embedded in the walls or connected to the exterior along a top edge or at least one side edge of the rear of the vehicle or trailer assembly.

15. The vehicle or trailer assembly of claim 10, wherein the one or more fans or pumps includes a plurality of fans or pumps positioned around a rear face of the vehicle or trailer assembly, and wherein each fan or pump of the plurality of fans or pumps directs air at an angle relative to a longitudinal axis of the vehicle or trailer assembly such that the plurality of fans or pumps direct air out of the rear of the vehicle or trailer assembly in a cone-like shape.

16. The vehicle or trailer assembly of claim 10, further including a projection configured to direct air from the one or more fans or pumps toward a center of the trailer, wherein the projection is pivotable.

17. A vehicle or trailer assembly, comprising:
    two or more openings longitudinally spaced apart along a length of the vehicle or trailer assembly, wherein the two or more openings are inset into an exterior of the vehicle or trailer assembly, and wherein at least one opening of the two or more openings connects to a rear of the vehicle or trailer assembly;
    at least one fan or pump embedded in walls or connected to the exterior of the vehicle or trailer assembly, wherein the at least one fan or pump is embedded in the walls or connected to the exterior along a top edge or at least one side edge of the vehicle or trailer assembly; and
    a projection configured to direct air from the at least one fan or pump toward a center of the trailer.

18. The vehicle or trailer assembly of claim 17, wherein the projection is pivotable.

19. The vehicle or trailer assembly of claim 17, wherein the at least one fan or pump includes a plurality of fans or pumps positioned around a rear face of the vehicle or trailer assembly, and wherein each fan or pump of the plurality of fans or pumps directs air at an angle relative to a longitudinal axis of the vehicle or trailer assembly such that the plurality of fans or pumps direct air out of the rear of the vehicle or trailer assembly in a cone-like shape.

20. The vehicle or trailer assembly of claim 17, wherein the at least one fan or pump includes at least one fan or pump that is embedded in the walls or exterior of the vehicle or trailer assembly between at least one opening of the two or more openings and at least one outlet in the rear of the vehicle or trailer assembly.

* * * * *